(12) United States Patent
Horio et al.

(10) Patent No.: US 11,161,998 B2
(45) Date of Patent: Nov. 2, 2021

(54) LAYERED BODY

(71) Applicant: DAI NIPPON PRINTING CO., LTD., Tokyo (JP)

(72) Inventors: Tomoyuki Horio, Tokyo (JP); Jun Sato, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 466 days.

(21) Appl. No.: 14/565,874

(22) Filed: Dec. 10, 2014

(65) Prior Publication Data
US 2015/0166815 A1  Jun. 18, 2015

(30) Foreign Application Priority Data

Dec. 12, 2013 (JP) .............................. JP2013-256680

(51) Int. Cl.
*C09D 133/08* (2006.01)
*C09D 133/14* (2006.01)

(52) U.S. Cl.
CPC ......... *C09D 133/08* (2013.01); *C09D 133/14* (2013.01); *Y10T 428/31935* (2015.04)

(58) Field of Classification Search
None
See application file for complete search history.

(56) References Cited

U.S. PATENT DOCUMENTS

| | | | | |
|---|---|---|---|---|
| 4,472,484 A * | 9/1984 | Vasta | ................... | C09D 125/14 428/421 |
| 6,165,578 A * | 12/2000 | Ohno | ....................... | G11B 7/24 369/288 |
| 2006/0014012 A1 * | 1/2006 | Thies | ..................... | G02B 1/105 428/323 |
| 2006/0078692 A1 * | 4/2006 | Murakami | ........... | G02B 5/3016 428/1.31 |
| 2006/0134429 A1 * | 6/2006 | Horio | ....................... | C09D 4/00 428/411.1 |
| 2008/0020170 A1 * | 1/2008 | Haubrich | .............. | C09D 133/14 428/65.1 |
| 2009/0176077 A1 * | 7/2009 | Horio | ..................... | G02B 1/105 428/217 |
| 2010/0086706 A1 * | 4/2010 | Everaerts | ................ | B32B 27/00 428/1.54 |
| 2013/0122311 A1 * | 5/2013 | Yoshihara | ................ | G02B 1/14 428/425.1 |
| 2013/0201556 A1 | 8/2013 | Inomata et al. | | |

FOREIGN PATENT DOCUMENTS

| | | | |
|---|---|---|---|
| JP | 11-300873 | 11/1999 | |
| JP | 2013-035210 | 2/2013 | |
| JP | 2015-016679 | 1/2015 | |
| KR | 10-2008-0011116 | 1/2008 | |
| KR | 10-2010-0132050 | 12/2010 | |
| WO | WO 2011/142429 A1 * | 11/2011 | .......... C08F 290/067 |
| WO | 2012/018009 | 2/2012 | |

* cited by examiner

*Primary Examiner* — Scott R. Walshon
*Assistant Examiner* — Thomas A Mangohig
(74) *Attorney, Agent, or Firm* — Hamre, Schumann, Mueller & Larson, P.C.

(57) ABSTRACT

The present invention provides a layered body having high hardness and excellent flexibility and useful as a substitute material for glass, and the layered body includes a substrate film, a hard coat layer on one face of the substrate film, and a resin-cured layer on the other face of the substrate film. The layered body is not cracked when wound on a 30 mm-diameter cylinder and has a hardness of 0.5 to 1.5 GPa when an indenter is pushed in 500 nm by a nano-indentation method and/or a hardness of 0.29 to 1.10 GPa at 500 mN load using a micro-hardness tester.

4 Claims, No Drawings

LAYERED BODY

TECHNICAL FIELD

The present invention relates to a layered body and more particularly a layered body as a substitute product for glass.

BACKGROUND ART

Although having high pencil hardness, a glass product has a problem of processability, that is hard to be bent and easy to be broken when dropped and is disadvantageous, that is heavy as compared with a plastic product. For that, in recent years, plastic products tend to substitute for glass products in terms of processability and light weight, but these plastic products are easy to be scratched in the surfaces and therefore, a hard coat film obtained by forming a hard coat layer on a substrate film, which is a resin film, is often layered thereon for the purpose of providing scratching resistance.

Such a conventional hard coat film is usually produced by forming a coating of a thermosetting resin or an ionizing radiation curable resin such as an ultraviolet-curing resin as thin as about 3 to 15 μm directly on or through an about 1 μm-thick primer layer.

However, regarding a conventional hard coat film, even if the hardness of its hard coat layer is sufficient, the hard coat layer is deformed correspondingly in the case where its substrate film, a base, is deformed due to the thinness of the film thickness and thus the hardness of the hard coat film as a whole is lowered and is not at all satisfactory.

For example, regarding a hard coat film obtained by applying a ultraviolet-curing coating material in the above-mentioned thickness to a poly(ethylene terephthalate) (PET) film, which has been widely used as a substrate film, the pencil hardness is generally as high as 3H level and it is quite far from 9H, the pencil hardness of glass.

On the other hand, if the thickness of a hard coat layer is simply made thicker than, for example, normal thickness of 3 to 15 μm, the hardness of the obtained hard coat film can be improved but there occurs a problem that the hard coat layer tends to be easily cracked and peeled and at the same time the hard coat film is curled significantly by curing shrinkage. Accordingly, it is difficult to obtain a hard coat film having characteristics good enough for practical uses by conventional techniques.

For example, Patent Literature 1 discloses a hard coat film having pencil hardness of 4H to 8H and obtained by forming a hard coat layer with a thickness of 3 to 15 μm on at least one face of a plastic substrate film through a buffer layer with a thickness of 3 to 15 μm.

Incidentally, a substitute product for glass flexible in terms of designs for displays usable for curved surfaces for digital signage uses, curved OLED, etc., has been required nowadays, and hard coat films to be used for these purposes are required to have sufficient hardness and excellent flexibility as well.

Particularly, thin, bendable, flexible type organic EL displays have recently been developed and flexible panels to be used for portable terminals such as smart phones and wrist watch type terminals, automotive interior displays, wrist watches, etc., also have drawn attention.

However, the conventional hard coat film described in Patent Literature 1 is not at all satisfactory for requirement for a curved surface since its flexibility is scarcely investigated, although its hardness for hard coat usability is mainly discussed.

As a layered body provided with both hardness and flexibility as before, for example, Patent Literature 2 discloses a layered body having a hard coat layer on one face of a first plastic film, which is an acrylic resin film, and a second plastic film layered on the other face through a adhesive layer, wherein the above-mentioned hard coat layer is a layer containing an organic-inorganic hybrid resin and a resin containing a fluorine compound additive.

However, the layered body described in Patent Literature 2 has pencil hardness about 5H and is thus unsatisfactory as a substitute material for glass and its flexibility at best prevents cracking and peeling when the layered body is wound around a 80 mm-diameter cylinder and is not at all satisfactory and is so low as to make processing in rolled state impossible and winding also impossible.

CITATION LIST

Patent Literature

Patent Literature 1: JP-A H11-300873
Patent Literature 2: JP-A 2013-35210

SUMMARY OF INVENTION

Technical Problem

In view of the above state of the art, it is an object of the present invention to provide a layered body having high hardness and excellent flexibility and useful as a substitute material for glass.

Solution to Problem

The present invention provides a layered body comprising a substrate film, a hard coat layer on one face of the substrate film, and a resin-cured layer on the other face of the substrate film, the layered body being not cracked when wound around a 30 mm-diameter cylinder and has a hardness of 0.5 to 1.5 GPa when an indenter is pushed in 500 nm by a nano-indentation method and/or a hardness of 0.29 to 1.10 GPa at 500 mN load using a micro-hardness tester.

In the layered body of the present invention, the above-mentioned resin-cured layer is preferably a cured layer of a mono-functional monomer.

The above-mentioned mono-functional monomer is preferably a mono-functional acrylic monomer.

The above-mentioned mono-functional acrylic monomer is preferably at least one selected from the group consisting of acryloyl morpholine, N-acryloyloxyethyl hexahydrophthalimide, cyclohexyl acrylate, tetrahydrofuryl acrylate, isobornyl acrylate, phenoxyethyl acrylate, and adamantyl acrylate.

Further, the layered body of the present invention preferably further comprising another substrate film on the surface of the resin-cured layer in the reverse side to the substrate film.

Hereinafter, the present invention will be described in detail.

The inventors of the present invention made various investigations on a layered body composed of a substrate film, which is a resin film, and a hard coat layer formed thereon and consequently found that formation of a resin-cured layer on the face of the substrate film in the reverse side to the hard coat layer could give a layered body having extremely excellent hardness and flexibility and the finding has now led to completion of the present invention.

The present invention provides a layered body comprising a substrate film, a hard coat layer on one face of the substrate film, and a resin-cured layer on the other face of the substrate film. The layered body of the present invention having such a configuration is extremely excellent in hardness and flexibility as compared with a conventional layered body used as a substitute material for glass.

The layered body of the present invention with such a configuration has a hardness (indentation hardness) of 0.5 to 1.5 GPa when an indenter is pushed in 500 nm by a nano-indentation method. If it is lower than 0.5 GPa, the layered body of the present invention cannot be used as a substitute material for glass and if it exceeds 1.5 GPa, difference of the hardness between the substrate film and the hard coat layer becomes significant so that cracking may occur easily. The lower limit of the above-mentioned hardness by the nano-indentation method is preferably 0.7 GPa and the upper limit is preferably 1.0 GPa.

In this description, the hardness measurement by the nano-indentation method is carried out using TI 950 TribolndenterIndenter manufactured by HYSITRON. That is, a Berkovich indenter (a trigonal pyramid) is pushed in 500 nm from the surface of the hard coat layer of the layered body of the present invention and kept for a prescribed time to relax the residual stress and thereafter, the load is removed, the maximum load is measured after relaxation and the indentation hardness is calculated according to $P_{max}/A$ using the maximum load ($P_{max}(\mu N)$) and the surface area of the dent with depth of 500 nm (A $nm^2$).

The hardness measured by the nano-indentation method is hardness of the surface of the hard coat layer and none of the substrate film, the resin-cured layer described below, another substrate film, etc., cause any effect on.

The layered body of the present invention also has a hardness of 0.29 to 1.10 GPa at 500 mN load using a micro-hardness tester. If it is lower than 0.29 GPa, the layered body of the present invention cannot be used as a substitute material for glass and if it exceeds 1.10 GPa, difference of the hardness between the substrate film and the hard coat layer becomes significant so that cracking may occur easily. The lower limit of the above-mentioned hardness at 500 mN load measured using a micro-hardness tester is preferably 0.5 GPa and the upper limit is preferably 0.9 GPa. The lower limit is further preferably 0.7 GPa.

In this description, the above-mentioned hardness using a micro-hardness tester is hardness measured by pushing a Vickers indenter (a quadrangular pyramid) at 500 mN load in the surface of the hard coat layer of the layered body of the present invention using PICODENTOR HM 500, manufactured by Fischer Instruments K.K. as a micro-hardness tester. Additionally, in the case where the Vickers indenter with such a load is pushed in the surface of the hard coat layer, the Vickers indenter is pushed in about 10 μm (8 to 11 μm).

The hardness with 500 mN load using such as micro-hardness tester is affected by the configuration of a layered body. That is, the hardness is affected by existence of a substrate film, a resin-cured layer described below, another substrate film, etc.

The layered body of the present invention is not cracked when wound around a 30 mm-diameter cylinder. In the case where cracked when wound around a 30 mm-diameter cylinder, the layered body of the present invention is insufficient in flexibility and cannot be usable for a curved face of a flexible panel or the like. The winding on the above-mentioned cylinder is carried out such that the hard coat layer of the layered body of the present invention is in the outer side.

The layered body of the present invention has a substrate film and a hard coat layer on one face of the substrate film.

The above-mentioned substrate film is not particularly limited and may be of, for example, polyester resin, acetate resin, polyethersulfone resin, polycarbonate resin, polyamide resin, polyimide resin, polyolefin resin, (meth)acrylic resin, polyvinyl chloride resin, polyvinylidene chloride resin, polystyrene resin, polyvinyl alcohol resin, polyarylate resin, polyphenylene sulfide resin, etc. Especially, polyester resin, polycarbonate resin, and polyolefin resin are used preferably.

In addition, the above-mentioned substrate film to be used may be films of amorphous olefin polymers (Cyclo-Olefin-Polymer: COP) having an alicyclic structure. The film may be a substrate using a norbornene polymer, a monocyclic olefin polymer, a cyclic conjugated diene polymer, a vinyl alicyclic hydrocarbon polymer, etc., and examples may be Zeonex and Zeonoa (norbornene resin) manufactured by Zeon Corporation; Sumilite FS-1700 manufactured by Sumitomo Bakelite Co., Ltd.; Arton (modified norbornene resin) manufactured by JSR Corporation; Apel (cyclic olefin copolymer) manufactured by Mitsui Chemicals Inc.; Topas (cyclic olefin copolymer) manufactured by Ticona, Optorez OZ-1000 series (alicyclic acrylic resin) manufactured by Hitachi Chemical Co., Ltd., etc.

Further, FV series (low refractive index, low photoelasticity film) manufactured by Asahi Kasei Chemicals Corporation are also preferable as a substitute substrate for triacetyl cellulose.

The thickness of the above-mentioned substrate film is preferably 5 to 100 μm. If the thickness is thinner than 5 μm, the mechanical strength of the layered body of the present invention becomes insufficient so that the layered body of the present invention cannot be used as a substitute for glass in some cases and if the thickness exceeds 100 μm, the flexibility of the layered body of the present invention may sometimes become insufficient. The thickness of the substrate film is more preferably 20 μm as the lower limit and 80 μm as the upper limit and furthermore preferably 40 μm as the lower limit and furthermore preferably 60 μm as the upper limit.

The surface of the above-mentioned substrate film may be treated by previous sputtering, corona discharge, ultraviolet ray irradiation, electron beam irradiation, etching treatment for chemical conversion, oxidation, or the like, and an undercoating treatment. Owing to execution of these previous treatments, the adhesion of a hard coat layer and a cured layer of a mono-functional monomer formed on the above-mentioned substrate film can be improved. Further, before formation of the hard coat layer or the cured layer, the substrate film surface may be subjected to dust removal or cleaned by washing with a solvent or ultrasonic washing, if necessary.

The above-mentioned hard coat layer preferably contains fine particles and a binder resin.

Since the above-mentioned hard coat layer contains fine particles, the pencil hardness of the hard coat layer defined in JIS K5400 can be improved and as a result, the hardness of the layered body of the present invention can be excellent and thus the layered body can be used preferably as a substitute material for glass.

The above-mentioned fine particles may be, for example, inorganic fine particles or organic fine particles.

Examples of the inorganic fine particles may be metal oxide fine particles such as silica ($SiO_2$), aluminum oxide, zirconia, titania, zinc oxide, germanium oxide, indium oxide, tin oxide, indium tin oxide (ITO), antimony oxide, cerium oxide, etc., and metal fluoride fine particles such as magnesium fluoride, sodium fluoride, etc. As the above-mentioned fine particles, metal fine particles, metal sulfide fine particles, and metal nitride fine particles may be used.

The above-mentioned organic fine particles are not particularly limited and examples may include fine particles of high density polyethylene, ultra high molecular weight polyethylene with molecular weight of 300000 or higher, polypropylene, polycarbonate, polyamide, polyester, melamine resin, diallyl phthalate resin, acrylic resin, etc.

The above-mentioned fine particles are preferable to have an average particle diameter of 5 to 100 nm. If the average particle diameter is lower than 5 nm, the hardness of the hard coat layer cannot be improved sufficiently in some cases and if it exceeds 100 nm, the transparency of the hard coat layer is worsened and haze is also worsened in some cases. The lower limit of the average particle diameter of the fine particles is more preferably 10 nm and the upper limit is more preferably 50 nm.

The above-mentioned hard coat layer preferably contains 30 to 300 parts by mass of fine particles to 100 parts by mass of a binder resin. If the amount is lower than 30 parts by mass, the hardness of the hard coat layer cannot be improved sufficiently in some cases and if it exceeds 300 parts by mass, the flexibility of the layered body of the present invention sometimes becomes insufficient and the transparency of the hard coat layer is sometimes lessened. Further, the adhesion between the substrate film and the hard coat layer is worsened and for that, it is not preferable. The lower limit of the content of the fine particles is more preferably 40 parts by mass and the upper limit is more preferably 200 parts by mass.

The fine particles are preferable to have ultraviolet (UV)-curable reactive groups in their surfaces and specifically, reactive silica is preferable. The above-mentioned UV-curable reactive groups may be preferably, for example, methacrylate group or acrylate group.

The form of the above-mentioned fine particles is preferably nonspherical type in terms of hardness of the hard coat layer and as such fine particles, for example, nonspherical silica is preferably used.

Binder resins which are transparent are preferable as the above-mentioned binder resin and preferable are, for example, those obtained by curing ionizing radiation curable resins, which are resins to be cured by ultraviolet rays or electron beam, by applying ultraviolet rays or electron beam.

In addition, in this description, "resin" means a concept including a monomer, an oligomer, a polymer, etc., unless otherwise specified.

Examples of the above-mentioned ionizing radiation curable resin may include compounds having one or two or more unsaturated bonds such as compounds having functional groups such as acrylate or the like. Examples of a compound having one unsaturated bond may include ethyl (meth)acrylate, ethylhexyl (meth)acrylate, styrene, methylstyrene, N-vinylpyrrolidone, etc. Examples of a compound having two or more unsaturated bonds may include polyfunctional compounds such as trimethylolpropane tri(meth)acrylate, tripropylene glycol di(meth)acrylate, diethylene glycol di(meth)acrylate, dipropylene glycol di(meth) acrylate, pentaerythritol tri(meth)acrylate, pentaerythritol tetra(meth)acrylate, dipentaerythritol hexa(meth)acrylate, 1,6-hexanediol di(meth)acrylate, neopentyl glycol di(meth) acrylate, trimethylolpropane tri(meth)acrylate, di(trimethylolpropane) tetra(meth)acrylate, dipentaerythritol penta(meth)acrylate, tripentaerythritol octa(meth)acrylate, tetrapentaerythritol deca(meth)acrylate, isocyanuric acid tri (meth)acrylate, isocyanuric acid di(meth)acrylate, polyester tri(meth)acrylate, polyester di(meth)acrylate, bisphenol di(meth)acrylate, diglycerin tetra(meth)acrylate, adamantyl di(meth)acrylate, isoboronyl di(meth)acrylate, dicyclopentane di(meth)acrylate, tricyclodecane di(meth)acrylate, di(tritmethylolpropane) tetra(meth)acrylate, etc. Especially, pentaerythritol tetraacrylate (PETTA) is used preferably. Additionally, in this description, "(meth)acrylate" means methacrylate and acrylate. In the present invention, as the ionizing radiation curable resin, those which are obtained by modifying the above-mentioned compounds with PO, EO, etc., can be used.

Especially, those which are most preferable as the above-mentioned ionizing radiation curable resin are dipentaerythritol tri(meth)acrylate, pentaerythritol tetra(meth)acrylate, dipentaerythritol hexa(meth)acrylate, dipentaerythritol penta(meth)acrylate, tripentaerythritol octa(meth)acrylate, tripentaerythritol hexa(meth)acrylate, tripentaerythritol hepta(meth)acrylate, trimethylolpropane tri(meth)acrylate, tetrapentaerythritol(meth)decaacrylate, tetrapentaerythritol (meth)octaacrylate, tetrapentaerythritol(meth)nonaacrylate, trimethylolpropanetrimethacrylate, and ditrimethylolpropane hexamethacrylate.

Further urethane acrylate is also usable as the ionizing radiation curable resin and tetra- or higher functional urethane acrylate is preferable.

Besides the above-mentioned compounds, those which are also usable as the ionizing radiation curable resin are relatively low molecular weight polyester resin having unsaturated double bonds, polyether resin, acrylic resin, epoxy resin, urethane resin, alkyd resin, spiroacetal resin, polybutadiene resin, polythiol polyene resin, etc.

The above-mentioned ionizing radiation curable resin can be used in combination with a solvent drying resin (a resin such as a thermoplastic resin or the like which can form a coating by drying a solvent added for adjusting the solid matter at the time of coating). Combination use of a solvent drying resin can efficiently prevent coating defects in the face coated with a coating solution at the time of forming an undercoat layer.

The solvent drying resin to be used in combination with the ionizing radiation curable resin is not particularly limited and in general, a thermoplastic resin can be used.

The above-mentioned thermoplastic resin is not particularly limited and examples may include, styrene resin, (meth)acrylic resin, vinyl acetate resin, vinyl ether resin, halogen-containing resin, alicyclic olefin resin, polycarbonate resin, polyester resin, polyamide resin, cellulose derivatives, silicone resin and rubber, elastomers, etc. The above-mentioned thermoplastic resin is preferably amorphous and soluble in an organic solvent (particularly a common solvent in which a plurality of polymers and curable compounds can be dissolved). Particularly, in terms of transparency and weather resistance, styrene resin, (meth)acrylic resin, alicyclic olefin resin, polyester resin, cellulose derivatives (cellulose esters or the like), etc., are preferable.

Further, the hard coat layer may contain a thermosetting resin.

As the above-mentioned thermosetting resin is not particularly limited and examples may include phenol resin, urea resin, diallyl phthalate resin, melamine resin, guanamine resin, unsaturated polyester resin, polyurethane resin, epoxy resin, aminoalkyd resin, melamine-urea co-condensed resin, silicone resin, polysiloxane resin, etc.

The hard coat layer containing the fine particles and the binder resin can be formed by applying a composition for hard coat layers containing the above-mentioned fine particles, a monomer component of the binder resin, and a solvent on the above-mentioned substrate film, drying the formed coating, and thereafter curing the coating by irradiating the coating with ionizing radiation.

Examples of the solvent contained in the composition for hard coat layers may include alcohols (e.g., methanol, ethanol, propanol, isopropanol, n-butanol, sec-butanol, tert-butanol, benzyl alcohol, PGME, and ethylene glycol), ketones (e.g., acetone, methyl ethyl ketone, methyl isobutyl ketone, cyclohexanone, etc.), ethers (e.g., dioxane, tetrahydrofurane, etc.), aliphatic hydrocarbons (e.g., hexane), alicyclic hydrocarbons (e.g., cyclohexane), aromatic hydrocarbons (e.g., toluene, xylene, etc.), halocarbons (e.g., dichloromethane, dichloroethane, etc.), esters (e.g., methyl acetate, ethyl acetate, butyl acetate, etc.), cellosolves (e.g., methyl cellosolve, ethyl cellosolve, etc.), cellosolve acetates, sulfoxides (e.g., dimethyl sulfoxide), amides (dimethylformamide, dimethylacetamide, etc.), and their mixtures.

The above-mentioned compositions for hard coat layers are preferable to further contain a photopolymerization initiator.

The above-mentioned photopolymerization initiator is not particularly limited and conventionally known ones can be used and specific examples may include acetophenone, benzophenone, Michler's benzoyl benzoate, α-amyloxime ester, thioxanthone, propiophenone, benzyl, benzoin, and acylphosphine oxide. Further, a photosensitizer is preferably mixed for the use and specific examples are n-butylamine, triethylamine, poly(n-butylphosphine), etc.

In the case where the above-mentioned binder resin is a resin having a radical polymerizable unsaturated group, as the photopolymerization initiator, acetophenone, benzophenone, thioxanthone, benzoin, benzoin methyl ether, etc. may be used alone or in form of a mixture. In the case where the above-mentioned binder resin is a resin having a cation polymerizable functional group, as the photopolymerization initiator, an aromatic diazonium salt, an aromatic sulfonium salt, an aromatic iodonium salt, a metallocene compound, a benzoinsulfonic acid ester, etc. may be used alone or in form of a mixture.

The content of the photopolymerization initiator in the above-mentioned composition for hard coat layers is preferably 0.5 to 10.0 parts by mass to 100 parts by mass of the binder resin. If it is less than 0.5 parts by mass, the hardness of a hard coat layer to be formed sometimes becomes insufficient and if it exceeds 100 parts by mass, contrarily, the hardness may possibly be inhibited and therefore, it is not preferable.

The content (solid matter) of a raw material in the above-mentioned composition for hard coat layers is not particularly limited but it is generally 5 to 70 wt. % and particularly preferably 25 to 60 wt. %.

Corresponding to purposes such as increase of the hardness of the hard coat layer, suppression of curing shrinkage, control of refractive index, etc., the composition for hard coat layers may contain conventionally known additives such as a dispersant, a surfactant, an anti-static agent, a silane coupling agent, a thickener, a coloring prevention agent, a coloring agent (pigment, dye), a defoaming agent, a leveling agent, a flame retardant, an ultraviolet absorber, a tackifier, a polymerization inhibitor, an antioxidant, a surface improver, etc.

As the above-mentioned leveling agent, preferable are, for example, silicone oil, a fluorine surfactant, etc., since the hard coat layer is prevented from having Benard cell structure. In the case where the resin composition containing a solvent is applied and dried, the surface tension difference or the like is caused between the coating surface and the inner face in the coating, and accordingly, many convections are caused in the coating. The structure generated by the convections is called as Benard cell structure and it becomes a s cause of a problem such as orange peel-like surface and coating defects in the hard coat layer to be formed.

A method for preparing the composition for hard coat layers is not particularly limited if the respective components are mixed evenly and may be carried out using a conventional apparatus such as a paint shaker, a bead mill, a kneader, a mixer, etc.

A method for applying the composition for hard coat layers on a light transmitting substrate is not particularly limited and may be a conventionally known method such as a spin coating method, a dipping method, a spray method, a die coating method, a bar coating method, a roll coater method, a meniscus coater method, a flexo-printing method, a screen printing method, a bead coater method, etc.

An irradiation method with ionizing radiation at the time of curing the coating after drying may be a method using a light source such as ultrahigh pressure mercury lamp, a high pressure mercury lamp, a low pressure mercury lamp, a carbon arc lamp, a black light fluorescent lamp, a metal halide lamp, etc.

Wavelength of the ultraviolet rays to be employed may be in a wavelength range of 190 to 380 nm. Specific examples of an electron beam source may include various kinds of electron beam accelerators such as Cockcroft-Walton, Van de Graaff, resonant transformer, insulation core transformer, or linear, Dynamitron, and high frequency type ones.

In the layered body of the present invention, the hardness of the hard coat layer is preferably 5H or higher and more preferably 6H or higher in a pencil hardness test (load 4.9N) according to JIS K5600-5-4 (1999).

The thickness of the above-mentioned hard coat layer is preferably 2.5 to 20.0 μm. If it is thinner than 2.5 μm, the surface of the hard coat layer tends to be scratched easily in some cases and if it exceeds 20.0 μm, not only the hard coat layer cannot be made thin but also the hard coat layer tends to be cracked easily or curled significantly in some cases. The thickness of the hard coat layer is more preferably 4 μm as the lower limit and 15 μm as the upper limit and more preferably 10 μm as the lower limit and more preferably 13 μm as the upper limit.

The thickness of the hard coat layer can be measured by cross section observation with a microscope.

The layered body of the present invention has a resin-cured layer on the other face of the substrate film.

In the layered body of the present invention, the above-mentioned resin-cured layer is preferably a mono-functional monomer cured layer (hereinafter, referred simply to as cured layer) and the layered body of the present invention having such a cured layer is made to have extremely excellent hardness as a substitute material for glass and also to be excellent in flexibility.

The thickness of the above-mentioned resin-cured layer is preferably 1 to 25 μm. If it is thinner than 1 the hardness of the layered body of the present invention and the adhesion to the substrate film tend to be insufficient in some cases and if it exceeds 25 μm, not only the resin-cured layer cannot be made thin but also curled significantly in some cases. Cracking tends to be caused easily, too. The thickness of the resin-cured layer is in a range of preferably 3 to 20 μm and more preferably 4 to 15 μm.

The thickness of the resin-cured layer can be measured by cross section observation with a microscope.

The above-mentioned mono-functional monomer to be used is preferably a mono-functional acrylic monomer.

The above-mentioned mono-functional acrylic monomer is preferably at least one kind monomer selected from the group consisting of acryloyl morpholine, N-acryloyloxyethyl hexahydrophthalimide, cyclohexyl acrylate, tetrahydrofuryl acrylate, isobornyl acrylate, phenoxyethyl acrylate, and adamantyl acrylate and particularly preferably acryloyl morpholine. Having such a cured layer, the layered body of the present invention is made sufficiently excellent in hardness and flexibility.

The cured layer can be formed by applying a composition for cured layers containing the above-mentioned mono-functional monomer and a solvent to the face of above-mentioned substrate film in the reverse side to the hard coat layer, drying the formed coating, and thereafter curing the coating. The drying degree of the coating may be adjusted properly and in the present invention, the coating may be dried to an extent that the content of solid matter becomes 100%. If the solvent remains in the cured layer after adhesion to the substrate film, the adhesion to the substrate film may possibly be worsened and after a durability test, the adhesion may possibly be worsened and whitening may occur to worsen transparency.

Examples of the solvent in the composition for cured layers include the same ones as exemplified for the composition for hard coat layers.

Similarly to the composition for hard coat layers, the composition for cured layers may contain a photopolymerization initiator, a dispersant, a surfactant, an anti-static agent, a silane coupling agent, a thickener, a coloring prevention agent, a coloring agent (pigment, dye), a defoaming agent, a leveling agent, a flame retardant, an ultraviolet absorber, a tackifier, a polymerization inhibitor, an antioxidant, a surface improver, etc.

A preparation method for the composition for cured layers, an application method, and a method for drying and curing a coating are not particularly limited and may be the same methods as those for the composition for hard coat layers.

Further, the layered body of the present invention preferably further comprises another substrate film on the surface of the above-mentioned resin-cured layer in the reverse side to the substrate film. Since having another substrate film, the layered body of the present invention is made to have more excellent hardness and is more preferably usable as a substitute material for glass.

Examples of another substrate film may be of the same ones as those used for the above-mentioned substrate film.

In the case where the layered body has another substrate film, the above-mentioned substrate film and another substrate film may be made of the same material or different materials. Further another substrate and the above-mentioned substrate film may have the same thickness or different thickness.

In the case of having another substrate film, the layered body of the present invention can be produced by, for example, forming a hard coat layer on one face of the above-mentioned substrate film, forming a coating on the other face with the above-mentioned composition for cured layers, thereafter sticking another substrate film to the coating, and successively, curing the coating.

The layered body of the present invention may have a conventionally known, arbitrary, and optically functional layer (a low refractive index layer, a high refractive index layer, an anti-staining layer, an anti-static layer, an antiglare layer, etc.) on the surface of the above-mentioned hard coat layer in the reverse side to the substrate film. These optically functional layers may be of an organic material, an inorganic material and a mixture of an organic material and an inorganic material and may have a conventional known configuration and be formed by a conventionally known method. Additionally, when one or more layer of any functional layer is formed on the above-mentioned hard coat layer, for example, a low refractive index layer is layered by applying a composition obtained by mixing hollow silica with an organic binder and curing the composition or a low refractive index layer is layered by sputtering an inorganic thin film of $SiO_x$ (x=1 to 2), the indentation hardness of the layered body of the present invention measured by nano-indentation can be improved to high hardness (upper limit about 4 GPa) 2 to 3 times as high as that in the case where the layered body has only the hard coat layer. That is attributed to the fact that the hardness in the outermost surface is in the improved state and thus the scratching resistance also becomes very high.

Since having the above-mentioned configuration, the layered body of the present invention is made to have extremely excellent hardness and is preferably usable as a substitute material for glass.

Practically, being made to have the above-mentioned configuration, the layered body of the present invention is so flexible as to be durably wound on a 30 mm cylinder and at the same time pencil hardness of 7H, 8H, and further 9H can be obtained. Herein, the pencil hardness is a physical property obtained according to applied force measured by a test involving setting a pencil on the hard coat layer surface, an object to be evaluated, pushing the pencil with a load, and horizontally drawing the pencil and a conventional hard coat layer which is simply hard cannot at all satisfy simultaneously both of the flexibility and the pencil hardness as high as 9H. Meanwhile, in the configuration of the layered body of the present invention, a resin-cured layer is formed and owing to the high adhesion between the resin-cured layer and the substrate film, it is supposed that deformation of the layered body generated when a pencil is put on or moved in the hard coat layer surface can be moderated and thus the hardness is improved. In addition, that pencil hardness of 7H to 9H cannot be obtained supposedly means that the adhesive strength cannot withstand the pushing force from the upper side and the horizontal force.

The above-mentioned pencil hardness is hardness of the surface of the hard coat layer of the layered body and means the pencil hardness (2) described in Examples or the like described below. In the present invention, in order to obtain a layered body having the most preferable high hardness and excellent flexibility and useful as a substitute material for glass, the inventors of the present invention found it insufficient to evaluate only the pencil hardness. That is, the inventors of the present invention found that there are layered bodies having hardness and flexibility in different levels even if having the same pencil hardness of 9H. Based on the finding, the inventors of the present invention considered separately 2 kinds of forces for pencil hardness evaluation and measured the hardness; that is, measured the pushing force from upper side as hardness at 500 mN load using a micro-hardness tester and the horizontal force as hardness measured when an indenter is pushed in 500 nm by a nano-indentation method. As a result, it is made clear that even if pencil hardness is the same 9H, actually the hardness is different based on numeral values. The hardness measurement method in the present invention makes evaluation at a level which a conventional pencil hardness evaluation cannot achieve.

Having extremely excellent flexibility, the layered body of the present invention can be preferably used as a display bendable along with a curved face, for example, for thin, bendable, flexible type organic EL displays and flexible panels to be used for portable terminals such as smart phones and wrist watch type terminals, automotive interior displays, wrist watches, etc. The layered body of the present invention can be used for image display devices such as liquid crystal display devices and touch panels, too.

Preferably, as described above, having extremely excellent hardness, the layered body of the present invention has the above-mentioned hard coat layer on one face of a substrate film and the above-mentioned resin-cured layer on the other face of the substrate film and also another substrate film on the face of the resin-cured layer in the reverse side to the substrate film and has a relation satisfied with the following equation.

Hard coat layer> resin-cured layer> substrate film and another substrate film

Herein, hardness of respective layers means hardness measured by pushing an indenter in cross sections of the respective layers which appear by cutting the layered body with the above-mentioned configuration of the present invention in the thickness direction by the above-mentioned nano-indentation method in the cross sectional direction.

Further, the layered body with the above-mentioned configuration of the present invention preferably satisfies the relation: pencil hardness (1)> pencil hardness (2)> pencil hardness (3): in which the pencil hardness (1) is measured in a hard coat layer side surface when the hard coat layer is formed on a substrate film or on another substrate film; the pencil hardness (2) is measured in a resin-cured layer side surface when the resin-cured layer is formed on a substrate film or on another substrate film; and the pencil hardness (3) measured in the surfaces of a substrate film or on another substrate film.

That is, to practically explain it using the respective layers of a layered body of Example 1 described below; in the case where a 15 μm-thick hard coat layer of Example 1 is formed on a 80 μm-thick triacetyl cellulose substrate, the pencil hardness (1) of the hard coat layer surface becomes 5H: and in the case where a 10 μm-thick resin-cured layer is formed using acryloylmorpholine on a 80 μm-thick triacetyl cellulose substrate in Example 1, the pencil hardness (2) of the resin-cured layer surface becomes B and the pencil hardness (3) of the 80 μm-thick triacetyl cellulose substrate surface becomes 3B. The relation of preferable hardness is equal to the hardness measured in the above-mentioned cross sections by the nano-indentation method.

The layered body with the configuration having another substrate film may be produced, as described above, by forming a hard coat layer on one face of a substrate film and thereafter sticking another substrate film to the other face of the substrate film through the above-mentioned coating, or by sticking the above-mentioned substrate film and another substrate film through the coating and thereafter forming a hard coat layer on one face of the substrate film.

In the production of either one of the methods, the coating may be cured by irradiating the coating with light in the former substrate film direction or in the latter substrate film direction.

Further, the substrate film and/or another substrate film often contains a UV absorbent, but in the case of the layered body of the present invention, the substrate film and/or another substrate film may or may not contain a UV absorbent if the adhesion to the resin-cured layer is sufficient. Additionally, in the case where the substrate film and another substrate film contains a UV absorbent, at the time of curing the coating, it is necessary for the coating to be irradiated reliably with ultraviolet rays.

In the case where adhesion of the substrate film and/or another substrate film to the resin-cured layer is insufficient, peeling may occur in the layered body of the present invention and it is also worse in terms of pencil hardness and therefore, it is undesirable.

The adhesive strength of the substrate film and/or another substrate film to the resin-cured layer is preferably 10 N/25 mm or higher in the case where 180° peeling strength in width of 25 mm is measured at peeling speed of 300 mm/min and room temperature (23° C.). If the adhesive strength is lower than 10 N/25 mm, separation of the substrate film and another substrate film from the resin-cured layer may easily be caused and the excellent effect of the present invention to give a layered body having high hardness and excellent flexibility and useful as substitute material for glass cannot be caused sufficiently in some cases. The adhesive strength of the substrate film and another substrate film to the resin-cured layer is more preferably 15 N/25 mm or higher and furthermore preferably 25 N/25 mm in the case where 180° peeling strength in width of 25 mm is measured at peeling speed of 300 mm/min and room temperature (23° C.)

Herein, regarding a conventional hard coat film having a hard coat layer on a substrate film, it is known well that the design property is improved by black-edged printing or white-edged printing in the reverse side face of the substrate film to the hard coat layer. A method for disposing the hard coat film with so improved design property in a liquid crystal display device or the like may be, for example, a method by filling the face on which the black-edged printing or the like is done with a adhesive and sticking the face filled with the adhesive to a polarizing plate in the display screen side of the liquid crystal display device or to a glass plate which the polarizing plate has.

However, in the case where the design property is improved by above-mentioned black-edged printing or the like, there is a problem that light transmission occurs unless the black-edged printing or white-edged printing is made rather thick, about 5 to 20 μm, and thus the design property is worsened. Accordingly, in the case where the design property is improved by above-mentioned black-edged printing in a conventional hard coat film, there is a problem that a step tends to be formed between the adhesive filling the face and the black-edged printing part and the hard coat film becomes difficult to be stuck to a polarizing plate or a glass plate.

To deal with the problem as described, another substrate film is also formed on the face of a conventional hard coat film filled with a adhesive and the substrate film is stuck to a polarizing plate or a glass plate to solve the problem of the above-mentioned step and solve the problem of sticking the substrate film to a polarizing plate or a glass plate.

However, since the adhesive has high viscosity, there is a problem that at the time of filling the face of a substrate film in which the black-edged printing is performed with the adhesive, air is sometimes entrained and also there is a problem that the hardness of the hard coat film stuck to the above-mentioned substrate film and to another substrate film by the adhesive becomes insufficient.

Meanwhile, in the case where the design property of the layered body of present invention is improved by the above-mentioned method, that is, the layered body of the present invention has a configuration that a black-edged printing, white-edged printing, or the like is performed in the outer circumferential part of the resin-cured layer between the substrate film and another substrate film, such a problem of air entrainment or such a problem of insufficient hardness is not caused.

The layered body of the present invention with the configuration can be produced by, for example, performing the above-mentioned black-edged printing or the like in the face of the above-mentioned substrate film in the reverse side to the side in which the hard coat layer is formed, applying the composition for cured layers to the face in which the black-edged printing, etc. is performed to form a coating, drying the coating, sticking the substrate film to another substrate film, and carrying out curing. Additionally, the layered body can be produced by performing black-edged printing, etc. in one face of another substrate film, forming a coating on the face in which the black-edged printing, etc. is performed with the above-mentioned composition for cured layers, thereafter drying the formed coating, and sticking the formed substrate film to the substrate film on which the hard coat layer is formed through the coating.

In the case of production by any one of the methods, since the viscosity of the above-mentioned composition for cured layers is sufficiently low as compared with that of the above-mentioned conventional adhesive, the composition for cured layers can be applied easily to the face in which the black-edged printing or the like is performed, without entraining air.

Owing to the above-mentioned configuration obtained by forming a hard coat layer on one face of a substrate film and a prescribed cured layer on the other face, both of high hardness and excellent flexibility are provided.

Advantageous Effects of Invention

Since having the above-mentioned configuration, the layered body of the present invention is provided with extremely excellent hardness and flexibility.

Accordingly, the layered body of the present invention can be preferably used as a substitute material for glass and for thin, bendable, flexible type organic EL displays and flexible panels to be used for portable terminals such as smart phones and wrist watch type terminals, automotive interior displays, wrist watches, etc., and also for image display devices such as liquid crystal display devices, touch panels, etc.

DESCRIPTION OF EMBODIMENTS

The contents of the present invention will be described along with the following Examples, but the contents of the present invention is not be considered as being limited by the following illustrated embodiments.

Example 1

As a substrate film, an 80 μm-thick triacetyl cellulose substrate (TD80ULN, manufactured by Fujifilm Corporation) was prepared and a composition 1 for hard coat layers as described below was applied to one face of the substrate film to form a coating. Next, the solvent in the coating was evaporated by circulating dry air at 70° C. for 45 seconds to the formed coating and the coating was cured by applying ultraviolet rays in nitrogen atmosphere (oxygen concentration, 200 ppm or lower) using an ultraviolet ray irradiation apparatus (light source H bulb manufactured by Fusion UV Systems Japan K.K.) such that the integrated light quantity was adjusted to be 200 mJ/cm$^2$ to form a hard coat layer with a thickness of 15 μm (at the time of cured).

(Composition 1 for Hard Coat Layers)

| | |
|---|---|
| Reactive nonspherical silica (ELCOM V8803, manufactured by JGC C&C) | 50 parts by mass |
| Dipentaerythritol hexaacrylate (DPHA, manufactured by Nippon Kayaku Co., Ltd.) | 50 parts by mass |
| Irgacure 184 (manufactured by BASF Japan Ltd.) | 4 parts by mass |
| MIBK | 75 parts by mass |
| MEK | 75 parts by mass |
| Fluorine non-reactive leveling agent (F477, manufactured by DIC) | 0.2 parts by mass |

Next, a composition A for cured layers as described below was applied to the face of the substrate film in the side reverse to the side in which the hard coat layer was formed to form a coating such that the film thickness became 10 μm after curing and dry air at 70° C. was circulated for 45 seconds to evaporate the solvent in the coating. As another substrate film, an 80 μm-thick triacetyl cellulose substrate (TD80ULN, manufactured by Fujifilm Corporation) was prepared and the above-mentioned former substrate film was stuck to this substrate film through the coating.

Thereafter, the coating was cured by applying ultraviolet rays from the another substrate film side in nitrogen atmosphere (oxygen concentration, 200 ppm or lower) using an ultraviolet ray irradiation apparatus (light source H bulb manufactured by Fusion ITV Systems Japan K.K.) such that the integrated light quantity was adjusted to be 600 mJ/cm$^2$ to form a resin-cured layer with a thickness of 10 μm (at the time of cured) to produce a layered body.

(Composition a for Cured Layers)

| | |
|---|---|
| Acryloylmorpholine (ACMO, manufactured by KOHJIN Film & Chemicals Co., Ltd.) | 100 parts by mass |
| Lucirin TPO (manufactured by BASF Japan Ltd.) | 4 parts by mass |
| MIBK | 20 parts by mass |

Example 2

A layered body was produced in the same manner as in Example 1, except that the thickness of the hard coat layer was 12 μm.

Example 3

A layered body was produced in the same manner as in Example 1, except that the thickness of the hard coat layer was 10 μm.

Example 4

A layered body was produced in the same manner as in Example 1, except that the thickness of the hard coat layer was 20 μm.

Example 5

A layered body was produced in the same manner as in Example 1, except that a 40 μm-thick triacetyl cellulose substrate (KC4UA, manufactured by KONICA MINOLTA, INC.) was used as the substrate film and another substrate film.

Example 6

A layered body was produced in the same manner as in Example 1, except that a 25 μm-thick triacetyl cellulose substrate (KC2UA, manufactured by KONICA MINOLTA, INC.) was used as the substrate film and another substrate film.

Example 7

A layered body was produced in the same manner as in Example 1, except that a 40 μm-thick acrylic substrate was used as the substrate film.

Example 8

A layered body was produced in the same manner as in Example 1, except that a 50 μm-thick poly (ethylene terepthalate) (PET) substrate (U48, manufactured by TORAY INDUSTRIES, INC.) was used as the substrate film.

Example 9

A layered body was produced in the same manner as in Example 1, except that a 40 μm-thick acrylic substrate was used as another substrate film.

Example 10

A layered body was produced in the same manner as in Example 1, except that a 50 μm-thick poly(ethylene terepthalate) (PET) substrate (U48, manufactured by TORAY INDUSTRIES, INC.) was used as another substrate film.

Example 11

A layered body was produced in the same manner as in Example 1, except that a 50 μm-thick amorphous olefin polymer (COP) substrate (Zeonoa series, manufactured by Zeon Corporation) was used as another substrate film.

Example 12

A layered body was produced in the same manner as in Example 5, except that the thickness of the resin-cured layer was 1 μm.

Example 13

A layered body was produced in the same manner as in Example 5, except that the thickness of the resin-cured layer was 5 μm.

Example 14

A layered body was produced in the same manner as in Example 5, except that the thickness of the resin-cured layer was 15 μm.

Example 15

A layered body was produced in the same manner as in Example 5, except that a 15 μm-thick hard coat layer was formed using the following composition 2 for hard coat layers.
(Composition 2 for Hard Coat Layers)

| | |
|---|---|
| Reactive nonspherical silica (ELCOM V8803, manufactured by JGC C&C) | 40 parts by mass |
| Dipentaerythritol hexaacrylate (DPHA, manufactured by Nippon Kayaku Co., Ltd.) | 60 parts by mass |
| Irgacure 184 (manufactured by BASF Japan Ltd.) | 4 parts by mass |
| MIBK | 75 parts by mass |
| MEK | 75 parts by mass |
| Fluorine non-reactive leveling agent (F477, manufactured by DIC) | 0.2 parts by mass |

Example 16

A layered body was produced in the same manner as in Example 5, except that a 15 μm-thick hard coat layer was formed using the following composition 3 for hard coat layers.
(Composition 3 for Hard Coat Layers)

| | |
|---|---|
| Solid reactive silica (ELCOM V8802, particle size of 12 nm, manufactured by JGC C&C) | 50 parts by mass |
| Dipentaerythritol hexaacrylate (DPHA, manufactured by Nippon Kayaku Co., Ltd.) | 60 parts by mass |
| Irgacure 184 (manufactured by BASF Japan Ltd.) | 4 parts by mass |
| MIBK | 75 parts by mass |
| MEK | 75 parts by mass |
| Fluorine non-reactive leveling agent (F477, manufactured by DIC) | 0.2 parts by mass |

Example 17

A layered body was produced in the same manner as in Example 5, except that a 15 μm-thick hard coat layer was formed using the following composition 4 for hard coat layers.
(Composition 4 for Hard Coat Layers)

| | |
|---|---|
| Reactive nonspherical silica (ELCOM V8803, manufactured by JGC C&C) | 50 parts by mass |
| Urethane acrylate (Shikoh UV 1700B, manufactured by The Nippon Synthetic Chemical Industry Co., Ltd.) | 50 parts by mass |
| Irgacure 184 (manufactured by BASF Japan Ltd.) | 4 parts by mass |
| MIBK | 75 parts by mass |
| MEK | 75 parts by mass |
| Fluorine non-reactive leveling agent (F477, manufactured by DIC) | 0.2 parts by mass |

Example 18

A layered body was produced in the same manner as in Example 5, except that a 15 μm-thick hard coat layer was formed using the following composition 5 for hard coat layers.

(Composition 5 for Hard Coat Layers)

| | |
|---|---|
| Reactive nonspherical silica (ELCOM V8803, manufactured by JGC C&C) | 50 parts by mass |
| Pentaerythritol triacrylate (PETA30, manufactured by Nippon Kayaku Co., Ltd.) | 50 parts by mass |
| Irgacure 184 (manufactured by BASF Japan Ltd.) | 4 parts by mass |
| MIBK | 75 parts by mass |
| MEK | 75 parts by mass |
| Fluorine non-reactive leveling agent (F477, manufactured by DIC) | 0.2 parts by mass |

Example 19

A layered body was produced in the same manner as in Example 5, except that a 15 μm-thick resin-cured layer was formed using the following composition B for cured layers.
(Composition B for Cured Layers)

| | |
|---|---|
| Isobornyl acrylate (IBXA, manufactured by OSAKA ORGANIC CHEMICAL INDUSTRY LTD.) | 100 parts by mass |
| Lucirin TPO (manufactured by BASF Japan Ltd.) | 4 parts by mass |
| MIBK | 20 parts by mass |

Example 20

A layered body was produced in the same manner as in Example 5, except that a 15 μm-thick resin-cured layer was formed using the following composition C for cured layers.
(Composition C for Cured Layers)

| | |
|---|---|
| Phenoxyethyl acrylate (Light Acrylate PO-A, manufactured by KYOEISHA CHEMICAL Co., LTD.) | 100 parts by mass |
| Lucirin TPO (manufactured by BASF Japan Ltd.) | 4 parts by mass |
| MIBK | 20 parts by mass |

Example 21

A layered body was produced in the same manner as in Example 5, except that a 15 μm-thick resin-cured layer was formed using the following composition D for cured layers.
(Composition D for Cured Layers)

| | |
|---|---|
| Acryloylmorpholine (ACMO, manufactured by KOHJIN Film & Chemicals Co., Ltd.) | 90 parts by mass |
| Pentaerythritol triacrylate (PET30, manufactured by Nippon Kayaku Co., Ltd.) | 10 parts by mass |
| Lucirin TPO (manufactured by BASF Japan Ltd.) | 4 parts by mass |
| MIBK | 20 parts by mass |

Example 22

A layered body was produced in the same manner as in Example 5, except that a 15 μm-thick resin-cured layer was formed using the following composition E for cured layers.
(Composition E for Cured Layers)

| | |
|---|---|
| Acryloylmorpholine (ACMO, manufactured by KOHJIN Film & Chemicals Co., Ltd.) | 90 parts by mass |
| Polyethylene glycol diacrylate (M240, manufactured by TOAGOSEI CO., LTD.) | 10 parts by mass |
| Lucirin TPO (manufactured by BASF Japan Ltd.) | 4 parts by mass |
| MIBK | 20 parts by mass |

Example 23

A layered body was produced in the same manner as in Example 5, except that a 15 μm-thick resin-cured layer was formed using the following composition F for cured layers.
(Composition F for Cured Layers)

| | |
|---|---|
| Acryloylmorpholine (ACMO, manufactured by KOHJIN Film & Chemicals Co., Ltd.) | 95 parts by mass |
| Quaternary ammonium group-containing acrylic polymer (Acrit 1SX-1055F, manufactured by TAISEI FINE CHEMICAL CO., LTD.) | 5 parts by mass |
| Lucirin TPO (manufactured by BASF Japan Ltd.) | 4 parts by mass |
| MIBK | 20 parts by mass |

Example 24

A layered body was produced in the same manner as in Example 5, except that a 15 μm-thick resin-cured layer was formed using the following composition G for cured layers.
(Composition G for Cured Layers)

| | |
|---|---|
| Dimethylol tricyclodecane diacrylate (Light Acrylate DCP-A, manufactured by KYOEISHA CHEMICAL CO., LTD.) | 20 parts by mass |
| Adamantyl acrylate (ADA, manufactured by OSAKA ORGANIC CHEMICAL INDUSTRY LTD.) | 80 parts by mass |
| Lucirin TPO (manufactured by BASF Japan Ltd.) | 4 parts by mass |
| MIBK | 20 parts by mass |

Example 25

A layered body was produced in the same manner as in Example 1, except that another substrate film was not stuck.

Example 26

A layered body was produced in the same manner as in Example 7, except that another substrate film was not stuck.

Example 27

A layered body was produced in the same manner as in Example 8, except that another substrate film was not stuck.

Comparative Example 1

A layered body was produced in the same manner as in Example 1, except that a resin-cured layer was formed using the following composition H for cured layers.
(Composition H for Cured Layers)

| | |
|---|---|
| Pentaerythritol triacrylate (PET30, manufactured by Nippon Kayaku Co., Ltd.) | 100 parts by mass |
| Lucirin TPO (manufactured by BASF Japan Ltd.) | 4 parts by mass |
| MIBK | 20 parts by mass |

Comparative Example 2

A layered body was produced in the same manner as in Comparative Example 1, except that a hard coat layer was formed using the following composition 6 for hard coat layers.

(Composition 6 for Hard Coat Layers)

| | |
|---|---|
| Urethane acrylate (UV 1700B, manufactured by The Nippon Synthetic Chemical Industry Co., Ltd.) | 50 parts by mass |
| Polyester triacrylate (M9050, manufactured by TOAGOSEI CO., LTD.) | 50 parts by mass |
| Irgacure 184 (manufactured by BASF Japan Ltd.) | 4 parts by mass |
| MIBK | 75 parts by mass |
| MEK | 75 parts by mass |
| Fluorine non-reactive leveling agent (F477, manufactured by DIC) | 0.2 parts by mass |

Comparative Example 3

A layered body was produced in the same manner as in Example 1, except that a resin-cured layer was formed using the following composition I for cured layers.

(Composition I for Cured Layers)

| | |
|---|---|
| Urethane acrylate (UV 6300B, manufactured by The Nippon Synthetic Chemical Industry Co., Ltd.) | 100 parts by mass |
| Lucirin TPO (manufactured by BASF Japan Ltd.) | 4 parts by mass |
| MIBK | 20 parts by mass |

Comparative Example 4

A layered body was produced in the same manner as in Example 1, except that a adhesive (Panaclean PD-S1, manufactured by PANAC Co., Ltd.) was used in place of the composition A for cured layers and a 25 μm-thick adhesive layer was formed in place of the resin-cured layer.

Comparative Example 5

A layered body was produced in the same manner as in Example 1, except that the composition A for cured layers was not applied and another substrate film and the substrate film were simply layered.

Comparative Example 6

A layered body was produced in the same manner as in Example 1, except that a 30 μm-thick resin-cured layer was formed using the composition A for cured layers.

Reference Example 1

A layered body was produced in the same manner as in Example 1, except that the thickness of the hard coat layer was 2 μm.

Reference Example 2

A layered body was produced in the same manner as in Example 1, except that the thickness of the hard coat layer was 40 μm.

Reference Example 3

A layered body was produced in the same manner as in Example 1, except that a 15 μm-thick hard coat layer was formed using the following composition 7 for hard coat layers.

(Composition 7 for Hard Coat Layers)

| | |
|---|---|
| Urethane acrylate (UV 1700B, manufactured by The Nippon Synthetic Chemical Industry Co., Ltd.) | 50 parts by mass |
| Dipentaerythritol hexaacrylate (DPHA, manufactured by Nippon Kayaku Co., Ltd.) | 50 parts by mass |
| Irgacure 184 (manufactured by BASF Japan Ltd.) | 4 parts by mass |
| MIBK | 75 parts by mass |
| MEK | 75 parts by mass |
| Fluorine non-reactive leveling agent (F477, manufactured by DIC) | 0.2 parts by mass |

Reference Example 4

A layered body was produced in the same manner as in Example 1, except that composition for cured layers was not cured.

The following evaluations were carried out for layered bodies obtained in Examples, Comparative Examples, and Reference Examples and the results are shown in Table 1.

(Nano-Indentation Hardness)

Using TI950 TriboIndenter manufactured by HYSITRON, a Berkovich indenter (a trigonal pyramid) was pushed in 500 nm from the surface of the hard coat layer of each layered body and kept for a prescribed time to relax the residual stress and thereafter, the load was removed, and successively the maximum load was measured after relaxation and the nano-indentation hardness was calculated according to $P_{max}/A$ using the maximum load $P_{max}$ (μN) and the surface area A (nm$^2$) of the dent with depth of 500 nm. In Table 1, it was expressed as Hardness 1.

(Hardness at 500 mN Load Using Micro-Hardness Tester)

Using PICODENTOR HM 500, manufactured by Fischer Instruments K.K., the hardness was measured by pushing in a Vickers indenter (a quadrangular pyramid) with a load of 500 mN from the surface of the hard coat layer of each layered body. At that time, the depth of the Vickers indenter (a quadrangular pyramid) pushed in was about 10 μm (8 to 11 μm) from the hard coat layer surface. In Table 1, it was expressed as "Hardness 2".

(Pencil Hardness)

In the layered body production process in Examples, Comparative Examples, and Reference Examples, samples having a hard coat layer on a substrate film were separately prepared and the pencil hardness (1) of the samples and the pencil hardness (2) of the layered bodies of Examples, Comparative Examples, and Reference Examples were measured respectively according to JIS K5600-5-4 (1999).

(Curl)

The respective layered bodies of Examples, Comparative Examples, and Reference Examples were cut out in 100 mm×100 mm-square in an arbitrary direction and left in ambient environments at 25° C. and 50% humidity for 24 hours. The height of curl at 4 corners was measured and the average value was measured as curl.

Good: less than 20 mm

Poor: not lower than 20 mm and not higher than 30 mm or the state of becoming so cylindrical as to make measurement impossible (Bending Property)

Samples in a size of 100 mm×150 mm were obtained from layered bodies of Examples, Comparative Examples, and Reference Examples and wound on a 30 mm-diameter cylinder in a manner that the hard coat layer side was in the outside and the bending property was evaluated according to the following standard.

Good: No crack formation
Poor: Cracks formed

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Hard coat layer | Composition for hard coat layer | 1 | 1 | 1 | 1 | 1 | 1 | 1 | 1 | 1 | 1 |
| | Thickness (μm) | 15 | 12 | 10 | 20 | 15 | 15 | 15 | 15 | 15 | 15 |
| Substrate film | Type | TAC | TAC | TAC | TAC | TAC | TAC | Acryl | PET | TAC | TAC |
| | Thickness (μm) | 80 | 80 | 80 | 80 | 40 | 25 | 40 | 50 | 40 | 40 |
| Cured layer | Composition for cured layer | A | A | A | A | A | A | A | A | A | A |
| | Thickness (μm) | 10 | 10 | 10 | 10 | 10 | 10 | 10 | 10 | 10 | 10 |
| Another substrate film | Type | TAC | TAC | TAC | TAC | TAC | TAC | TAC | TAC | Acryl | PET |
| | Thickness (μm) | 80 | 80 | 80 | 80 | 40 | 25 | 40 | 40 | 40 | 50 |
| Hardness 1 (GPa) | | 0.98 | 0.98 | 0.98 | 0.98 | 0.98 | 0.98 | 0.98 | 0.98 | 0.98 | 0.98 |
| Hardness 2 (GPa) | | 0.77 | 0.71 | 0.68 | 0.87 | 0.71 | 0.73 | 0.68 | 0.72 | 0.70 | 0.72 |
| Pencil hardness (1) | | 5H | 5H | 4H | 6H | 5H | 5H | 4H | 5H | 5H | 5H |
| Pencil hardness (2) | | 9H | 9H | 8H | 9H | 9H | 9H | 8H | 9H | 9H | 9H |
| Curl | | Good | Good | Good | Good | Good | Good | Good | Good | Good | Good |
| Bending property | | Good | Good | Good | Good | Good | Good | Good | Good | Good | Good |

| | | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Hard coat layer | Composition for hard coat layer | 1 | 1 | 1 | 1 | 2 | 3 | 4 | 5 | 1 | 1 |
| | Thickness (μm) | 15 | 15 | 15 | 15 | 15 | 15 | 15 | 15 | 15 | 15 |
| Substrate film | Type | TAC | TAC | TAC | TAC | TAC | TAC | TAC | TAC | TAC | TAC |
| | Thickness (μm) | 40 | 40 | 40 | 40 | 40 | 40 | 40 | 40 | 40 | 40 |
| Cured layer | Composition for cured layer | A | A | A | A | A | A | A | A | B | C |
| | Thickness (μm) | 10 | 1 | 5 | 15 | 10 | 10 | 10 | 10 | 15 | 15 |
| Another substrate film | Type | COP | TAC | TAC | TAC | TAC | TAC | TAC | TAC | TAC | TAC |
| | Thickness (μm) | 50 | 40 | 40 | 40 | 40 | 40 | 40 | 40 | 40 | 40 |
| Hardness 1 (GPa) | | 0.98 | 0.98 | 0.98 | 0.98 | 0.71 | 0.68 | 0.92 | 0.95 | 0.98 | 0.98 |
| Hardness 2 (GPa) | | 0.64 | 0.65 | 0.71 | 0.82 | 0.70 | 0.65 | 0.70 | 0.71 | 0.77 | 0.75 |
| Pencil hardness (1) | | 5H | 5H | 5H | 5H | 5H | 4H | 5H | 5H | 5H | 5H |
| Pencil hardness (2) | | 8H | 8H | 9H | 9H | 9H | 8H | 9H | 9H | 9H | 9H |
| Curl | | Good | Good | Good | Good | Good | Good | Good | Good | Good | Good |
| Bending property | | Good | Good | Good | Good | Good | Good | Good | Good | Good | Good |

| | | Example 21 | Example 22 | Example 23 | Example 24 | Example 25 | Example 26 | Example 27 | Comparative Example 1 | Comparative Example 2 |
|---|---|---|---|---|---|---|---|---|---|---|
| Hard coat layer | Composition for hard coat layer | 1 | 1 | 1 | 1 | 1 | 1 | 1 | 1 | 6 |
| | Thickness (μm) | 15 | 15 | 15 | 15 | 15 | 15 | 15 | 15 | 15 |
| Substrate film | Type | TAC | TAC | TAC | TAC | TAC | Acryl | PET | TAC | TAC |
| | Thickness (μm) | 40 | 40 | 40 | 40 | 80 | 40 | 50 | 80 | 80 |
| Cured layer | Composition for cured layer | D | E | F | G | A | A | A | H | H |
| | Thickness (μm) | 15 | 15 | 15 | 15 | 10 | 10 | 10 | 10 | 10 |
| Another substrate film | Type | TAC | TAC | TAC | TAC | — | — | — | TAC | TAC |
| | Thickness (μm) | 40 | 40 | 40 | 40 | — | — | — | 80 | 80 |
| Hardness 1 (GPa) | | 0.98 | 0.98 | 0.98 | 0.98 | 0.98 | 0.98 | 0.98 | 0.98 | 0.40 |
| Hardness 2 (GPa) | | 0.83 | 0.72 | 0.71 | 0.76 | 0.68 | 0.64 | 0.66 | 1.15 | 0.27 |
| Pencil hardness (1) | | 5H | 5H | 5H | 5H | 4H | 4H | 4H | 5H | 3H |
| Pencil hardness (2) | | 9H | 9H | 9H | 9H | 8H | 7H | 8H | 9H | 4H |
| Curl | | Good | Good | Good | Good | Good | Good | Good | Good | Good |
| Bending property | | Good | Good | Good | Good | Good | Good | Good | Poor | Poor |

TABLE 1-continued

| | | Comparative Example 3 | Comparative Example 4 | Comparative Example 5 | Comparative Example 6 | Reference Example 1 | Reference Example 2 | Reference Example 3 | Reference Example 4 |
|---|---|---|---|---|---|---|---|---|---|
| Hard coat layer | Composition for hard coat layer | 1 | 1 | 1 | 1 | 1 | 1 | 7 | 1 |
| | Thickness (μm) | 15 | 15 | 15 | 15 | 2 | 40 | 15 | 15 |
| Substrate film | Type | TAC | TAC | TAC | TAC | TAC | TAC | TAC | TAC |
| | Thickness (μm) | 80 | 80 | 80 | 80 | 80 | 80 | 80 | 80 |
| Cured layer | Composition for cured layer | I | Adhesive | — | A | A | A | A | A |
| | Thickness (μm) | 10 | 10 | — | 30 | 10 | 10 | 10 | 10 (uncured) |
| Another substrate film | Type | TAC | TAC | TAC | TAC | TAC | TAC | TAC | TAC |
| | Thickness (μm) | 80 | 80 | 80 | 80 | 80 | 80 | 80 | 80 |
| Hardness 1 (GPa) | | 0.98 | 0.98 | 0.98 | 0.98 | 0.98 | 0.98 | 0.45 | 0.98 |
| Hardness 2 (GPa) | | 0.22 | 0.15 | 0.25 | 0.91 | 0.25 | 1.25 | 0.26 | 0.25 |
| Pencil hardness (1) | | 5H | 5H | 5H | 5H | 2H | 8H | 3H | 5H |
| Pencil hardness (2) | | 5H | 3H | 5H | 9H | 2H | 9H | 3H | 5H |
| Curl | | Good | Good | Good | Good | Good | Poor | Good | Good |
| Bending property | | Good | Good | Good | Poor | Good | Poor | Good | Good |

As shown in Table 1, the layered bodies of Examples each having a prescribed cured layer on one face of a substrate film were found to have excellent hardness (nano-indentation hardness, hardness at 500 mN load measured using a micro-hardness tester, and pencil hardness) and an excellent bending property. The adhesive strength between the substrate film of each layered body of Examples and the resin-cured layer was as high as 10N/25 mm to 15N/25 mm when 180° peeling strength in width of 25 mm was measured at peeling speed of 300 mm/min and room temperature (23° C.). It was supposed that the substrate film and the resin-cured layer were sufficiently bonded and it contributed to the excellent hardness.

On the other hand, the layered bodies of Comparative Examples 1 and 2 were inferior in the bending property and the layered bodies of Comparative Examples 3 and 4 were inferior in hardness, particularly in the evaluation of the pencil hardness (2). The adhesive strength between the substrate film and the resin-cured layer of the layered body of Comparative Example 3 was as extremely low as 0.05N/25 mm when 180° peeling strength in width of 25 mm was measured at peeling speed of 300 mm/min and room temperature (23° C.), and the substrate film and the resin-cured layer were not sufficiently bonded.

The layered bodies of Reference Examples 1 and 3 were inferior in hardness, particularly in evaluation of pencil hardness (1) and (2): the layered body of Reference Example 2 was inferior in evaluation of the curl and the bending property: and the layered body of Reference Example 4 was inferior in hardness, particularly in evaluation of pencil hardness (2). Additionally, in the layered body of Reference Example 4, the substrate film and the resin-cured layer were not sufficiently bonded.

In the case of the layered body of Comparative Example 4 in which the adhesive layer was formed in place of the resin-cured layer, the adhesive strength between the adhesive layer and the substrate film was as good as 13 N/25 mm when 180° peeling strength in width of 25 mm was measured at peeling speed of 300 mm/min and room temperature (23° C.) but the hardness was low. That is, the hardness balance was as to be hard coat layer> substrate film and another substrate film> resin-cured layer and therefore, no satisfactory hardness in the entire layered body was obtained. Further, the hardness means the hardness measured by pushing an indenter in the cross section of each layer appearing when each layered body was cut in the thickness direction by the above-described nano-indentation method in the cross section direction, or pencil hardness measured in the surface of the substrate film or another substrate film, or pencil hardness measured in the hard coat layer surface or the resin-cured layer surface after the hard coat layer or the resin-cured layer was formed on the substrate film or another substrate film.

In the case where the resin-cured layer was not yet cured just like the layered body of Reference Example 4 or in the case where no resin-cured layer was formed just like the layered body of Reference Example 5, the adhesive strength between the substrate film and either the uncured coating or another substrate film was as extremely low as 0.02 to 0.03N/25 mm or very scarce when 180° peeling strength in width of 25 mm was measured at peeling speed of 300 mm/min and room temperature (23° C.). Further, the same hardness balance as that of the layered body of Comparative Example 4 in which the above-mentioned adhesive layer was formed and no hardness in the entire layered body was obtained.

INDUSTRIAL APPLICABILITY

A layered body of the present invention can be used as a substitute material for glass and at the same time for thin, bendable, flexible type organic EL displays and flexible panels to be used for portable terminals such as smart phones and wrist watch type terminals, automotive interior display devices, wrist watches, etc., and also for image display devices such as liquid crystal display devices, touch panels, etc.

The invention claimed is:
1. A layered body comprising:
a first substrate film;
a hard coat layer on a first face of the first substrate film;
a resin-cured layer on a second face of the first substrate film; and
a second substrate film on the resin-cured layer,
wherein the second face is opposing the first face,
the resin-cured layer has a first surface and a second surface, the second surface of the resin-cured layer is opposing the first surface of the resin-cured layer, and the second surface of the resin-cured layer directly contacts the second substrate film, the first surface of the resin-cured layer directly contacts the second face of the first substrate film, the layered body is not cracked when wound on a 30 mm-diameter cylinder, the layered body has a hardness of 0.5 to 1.5 GPa measured by pushing an indenter in 500 nm in accordance with a nano-indentation method and/or a hardness of 0.29 to 1.10 GPa at 500 mN load using a micro-hardness tester, the resin-cured layer has a thickness in a range from 3 to 25 μm, the resin-cured layer is a cured layer of a composition whose monomer consists of at least one mono-functional acrylic monomer selected from the group consisting of acryloyl morpholine, N-acryloyloxyethyl hexahydrophthalimide, isobornyl acrylate, phenoxyethyl acrylate, and adamantyl acrylate, hardnesses of the hard coat layer, the first substrate film, the resin-cured layer, and the second substrate film satisfy the following relationship: the hard coat layer>the resin-cured layer>the first substrate film and the second substrate film, the hardness is measured by pushing an indenter into cross sections of the hard coat layer, the resin-cured layer, and the first and second substrate films in the thickness direction of the layered body in accordance with the nano-indentation method, the thickness of the hard coat layer is 2.5 to 20.0 μm, and the hard coat layer contains fine particles having an average particle diameter of 5 to 100 nm.

2. The layered body according to claim 1, the first substrate film is a triacetyl cellulose substrate, poly(ethylene terephthalate) substrate, or olefin polymer substrate.

3. The layered body according to claim 1, wherein the second substrate film is a triacetylcellulose substrate, poly (ethylene terephthalate) substrate, or olefin polymer substrate, and the hard coat layer contains the fine particles and a binder resin.

4. The layered body according to claim 1,
wherein the at least one mono-functional acrylic monomer is selected from the group consisting of acryloyl morpholine, N-acryloyloxyethyl hexahydrophthalimide, phenoxyethyl acrylate, and adamantyl acrylate.

\* \* \* \* \*